(12) United States Patent
Someya et al.

(10) Patent No.: US 8,326,072 B2
(45) Date of Patent: Dec. 4, 2012

(54) IMAGE DISPLAY APPARATUS, AND METHOD AND APPARATUS FOR PROCESSING IMAGES

(75) Inventors: Jun Someya, Tokyo (JP); Masako Asamura, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 1125 days.

(21) Appl. No.: 12/187,876

(22) Filed: Aug. 7, 2008

(65) Prior Publication Data

US 2009/0041348 A1 Feb. 12, 2009

(30) Foreign Application Priority Data

Aug. 9, 2007 (JP) ................................. 2007-207762

(51) Int. Cl.
*G06K 9/40* (2006.01)
(52) U.S. Cl. .......... 382/260; 345/87; 347/130; 347/239; 358/1.9; 358/2.1; 358/3.01; 358/3.13; 382/100; 382/128; 382/133; 382/232; 382/233; 382/266
(58) Field of Classification Search .................. None
See application file for complete search history.

(56) References Cited

U.S. PATENT DOCUMENTS

| | | | |
|---|---|---|---|
| 5,300,960 A * | 4/1994 | Pham et al. | 347/130 |
| 5,450,531 A * | 9/1995 | Ng et al. | 382/266 |
| 5,583,659 A * | 12/1996 | Lee et al. | 358/3.13 |
| 5,999,658 A | 12/1999 | Shimazu et al. | |
| 6,021,256 A * | 2/2000 | Ng et al. | 358/1.9 |
| 7,079,287 B1 * | 7/2006 | Ng et al. | 358/2.1 |
| 7,259,894 B2 * | 8/2007 | Kuwata et al. | 358/3.01 |
| 2006/0197993 A1 | 9/2006 | Yamanaka et al. | |
| 2007/0188525 A1 | 8/2007 | Yamanaka et al. | |

FOREIGN PATENT DOCUMENTS

| | | |
|---|---|---|
| JP | 10-084481 A | 3/1998 |
| JP | 2001-144958 | 5/2001 |
| JP | 2001-282190 | 10/2001 |
| JP | 2007-181189 A | 7/2007 |

* cited by examiner

*Primary Examiner* — Tsung-Yin Tsai
(74) *Attorney, Agent, or Firm* — Birch, Stewart, Kolasch & Birch, LLP

(57) ABSTRACT

An image display apparatus, and an apparatuse for and a method of image processing are provided that can reduce in real time a quantization noise in an image signal received by the image display apparatus. The image processor apparatus includes a variation calculator that calculates, as a variation B of grayscale, a difference in a grayscale value between adjacent pixels in a single dimension in a spatial direction, of an image signal A; a variation limiter that limits a range of a possible value of the variation B calculated by the variation calculator; a gradient determination unit that calculates a gradient of grayscale of image signals from the variation C having the value limited; an additional bit generator that generates an additional bit, based on the image signal grayscale gradient calculated by the gradient determination unit; a bit adder that adds to the image signals the additional-bit-generator-generated additional bit, to output the additional-bit-added image signals; and a display unit that displays an image based on an image signal to be output from the bit adder.

12 Claims, 13 Drawing Sheets

IMAGE DISPLAY APPARATUS, AND METHOD AND APPARATUS FOR PROCESSING IMAGES

TECHNICAL FIELD

The present invention relates to image display apparatuses, and method and apparatuses for processing images.

BACKGROUND OF THE INVENTION

Display devices that display images by modulating discretely arranged matrix pixels by light reflection, transmission, or light emission as in a liquid crystal, a plasma, an EL (electro-luminescence), a DMD (digital mirror device) or the like, are used for various image display devices such as projectors, and monitors for use with computers, other than thin screen television sets or rear-projection television sets. In recent years, owing to technological leaps in high-definition television broadcast and processing speed of computer systems, as high definition imaging technology advances, higher intensity technology also rapidly progresses on account of improvement of the associated devices. Along with the high intensity display devices, a quantization noise that occurs when digitized signal images are displayed has become noticeable.

When analog image signals are received, the quantization noise is generally reduced by increasing the quantization number of an analog-to-digital (A/D) converter (for instance, the number of bits increases from 8 bits to 10 bits); however, now that high definition images have become commonplace, the increase of the quantization number of the A/D converter leads to significant cost increase. Moreover, due to a signaling protocol between a sending party and a receiving party the digital transmission system does not allow the quantization number to be one-sidedly varied. Likewise, since DVDs, or network digital contents also have the predetermined quantization number, the increase of the quantization number of the contents per se is hard to increase because a new specification needs to be established.

Furthermore, in signal processing of the television and the like, an expansion of the dynamic range of an image signal received to display impact-filled images and a conversion of the images into high contrast ones by changing gray level to the intensity value, are carried out. The expansion process of the dynamic range and the change of gray level to the intensity value results in the occurrence of banding (a noticeable jump in the gray levels between adjacent regions—hereinafter referred to as "tone jump") while displaying high contrast images.

In such situations, there is disclosed a method in which tone jump is reduced by carrying out the following: a combination of gray levels in a case where the tone jump is caused with image processing is searched; a region having the gray level combination is identified from among image signals; and in the region of the image, the tone jump is reduced by implementing the processing of grayscale interpolation to neighboring pixels where the tone jump is caused. (See, for instance, Japanese Unexamined Patent Publication H10-84481 (paragraph 0051 through 0055, FIG. 9.))

However, in the above-described processing, a combination of gray levels in which the tone jump is caused has been preliminary searched; a region adjacent to the combination of gray levels in which the tone jump is caused has been detected from among image signals; and the processing of grayscale interpolation has been implemented in the periphery of the edge of the detected region. A quantization noise, which has a similar characteristic as the tone jump, can also be reduced by the above-described processing. However, a problem has been that if such a processing method is used to reduce the quantization noise and tone jump, image signals that are delivered temporally continuously cannot be processed timely, thus causing the received image signals not to be processed in real time.

SUMMARY OF THE INVENTION

The present invention is made in light of the above-described problem. It is an object to provide an image display apparatus, and an apparatuses for and a method of image processing that are capable of reducing quantization noise in real time with respect to image signals received by a display device An image processor apparatus according to the present invention, for processing image signals that contain discrete image data in a temporal direction and a spatial direction and for displaying the processed image signals, the image processor apparatus comprises a variation calculator that calculates, as a variation in the amount of grayscale, a difference in grayscale value between pixels neighboring in a single dimension in a spatial direction, of image signals; a variation limiter that limits a range of a possible value of the variation calculated by the variation calculator; a gradient determination unit that calculates a gradient of grayscale of image signals from the variation in which the value possible is limited to the range; an additional bit generator that generates an additional bit, based on the image signal grayscale gradient calculated by the gradient determination unit unit; and a bit adder that adds to the image signals the additional-bit-generator-generated additional bit, to output the additional-bit-added image signals.

The image display apparatus according to the present invention also comprises the image processor apparatus, an image receiver unit that receives image signals to output them to the image processor apparatus, and a display unit that displays image signals that is output from the image processor apparatus.

In addition, a method of processing images according to the present invention, that processes an image signal that contains discrete image data in a temporal direction and a spatial direction, is practiced so that a difference in grayscale value between pixels neighboring in a single dimension in a spatial direction, of image signals is calculated as the variation in the amount of grayscale; a range of a possible value of the calculated variation is limited to calculate a gradient of grayscale by both number of pixels in the single dimension, in which the variation has consecutive zeros and variation having the value limited; and by adding to the image signal an additional bit generated based on the calculated grayscale gradient, an image signal of a quantization error smaller than the quantization error of the image signal is generated. According to the present invention, since the quantization number of image signals can be increased in real time, a quantization noise, which occurs in A/D conversion, is reduced also when images are displayed by a high intensity display device, whereby an image display apparatus and an apparatus for and a method of processing an image are provided to display images of smoothed gray levels and high definition.

DESCRIPTION OF THE PREFERRED EMBODIMENTS

Embodiment 1

Figure 1:
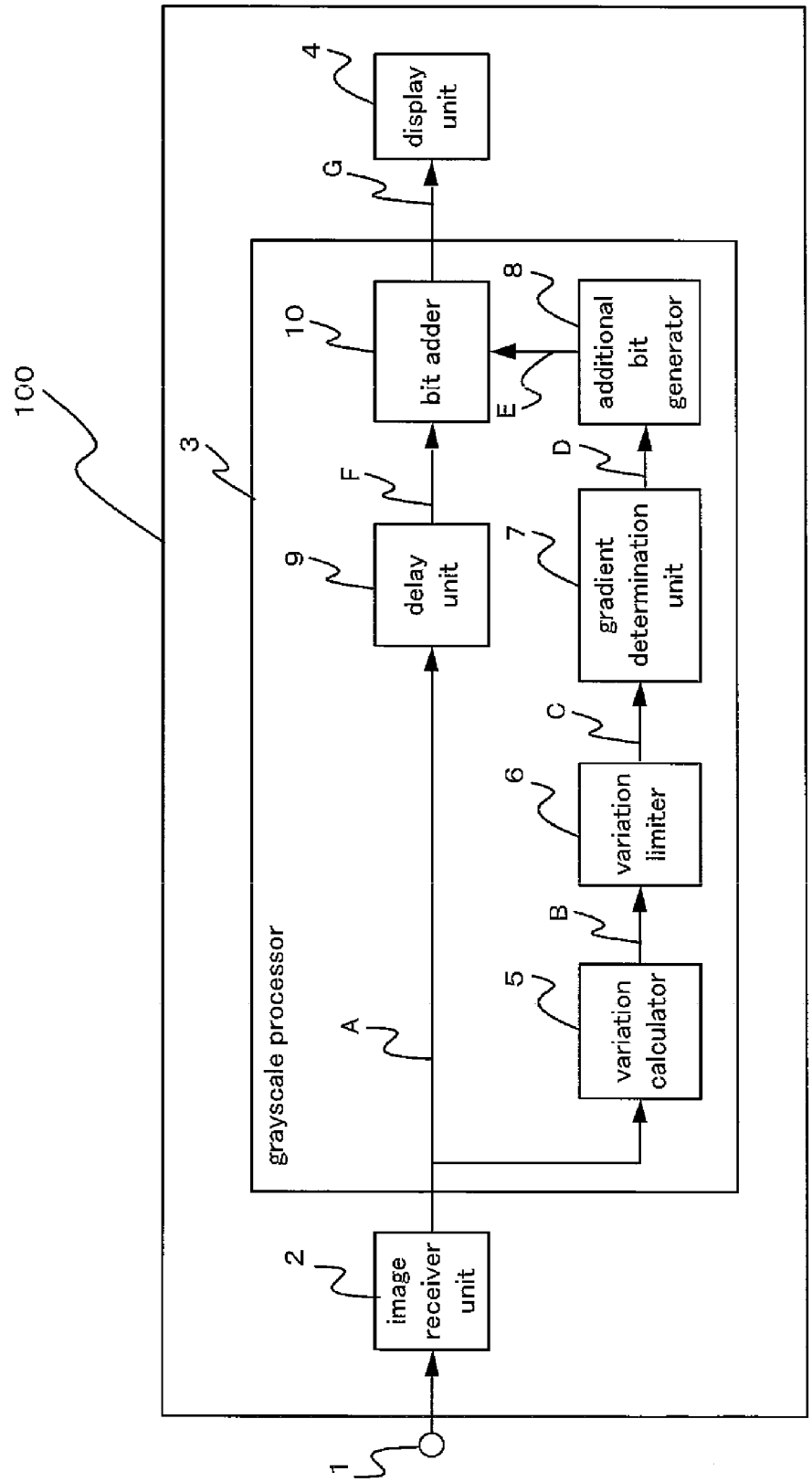
FIG. 1 is a block diagram showing a configuration of an image display apparatus according to Embodiment 1 of the present invention.

FIG. 1 is a block diagram showing a configuration of an image display apparatus 100 according to Embodiment 1 of the present invention. The image display apparatus 100 as shown in FIG. 1 displays an image whose brightness is based on grayscale image data, including pixels according to the received image signals. General operation of the image display apparatus 100 will be described below referring to FIG. 1.

An analog or digital image signal is transferred from an external device to an input terminal 1. The input of the image signal to the input terminal 1 may be performed by using a transmission medium such as an electrical cable, radio wave, or light. The image signal delivered to the input terminal 1, which is received by a receiver unit 2, is converted into an image signal of a format used for subsequent processing. The conversion processing is performed according to a transmission system: for instance, when the image signal delivered to the input terminal 1 is analog one, the signal is converted into a digital image signal using an analog-to-digital converter; when it is a serial digital image signal, it is converted into a predetermined image signal using serial-parallel conversion; an image signal has a format represented by luminance and color chromaticity, or a format represented by primary color signals such as red, green, and blue; however, a grayscale processor 3 is an image processor apparatus capable of processing a signal of either format in the same way.

An image signal A outputted from the receiver unit 2 is input to a variation calculator 5 and a delay unit 9 of the grayscale processor 3, which constitute the image processor apparatus. The variation calculator 5 calculates, as a variation (hereinafter denotes "amount of change") B, a difference of a grayscale value between pixels neighboring in one direction in a spatial direction, of the input image signal A, and then transfers the difference to a variation limiter 6. The variation limiter 6 limits the output value so that the input variation B falls within a range defined by the maximum value of +1 and the minimum value of −1. The variation limiter 6 outputs a variation C whose value is limited to a gradient determination unit 7.

The gradient determination unit 7 determines the gradient of grayscale in a single dimension of the image signal A using the variation C that has been input from the variation limiter 6. Since the variation C is limited to within a range between −1 and +1, the grayscale gradient to be calculated is a value between −1 and +1.

The grayscale gradient D calculated by the gradient determination unit 7 is transferred to an additional bit generator 8. An additional bit generator 8 calculates from the grayscale gradient D that has been input thereto a substantial variation of grayscale value between neighboring pixels, to transfer to a bit adder 10 the calculated variation as an additional bit E. The substantial variation calculated here is an amount of change that contains a fractional value with respect to grayscale value of the image signal A.

On the other hand, by delaying by a predetermined period the image signal A that has been output from the receiver unit 2, the delay unit 9 outputs the image signal F—the image signal A that is delayed in such a way that the downstream bit adder 10 properly adds the additional bit E to the image signal A.

The image signal F delayed by a predetermined period with the delay unit 9 is input to the bit adder 10. The bit adder 10 adds the additional bit E, which has transferred from the additional bit generator 8, to the image signal F that has generated from the delay unit 9, to then output a new image signal G. The image signal C transferred from the bit adder 10—i.e., transferred from the image processor apparatus—is input to the display unit 4, thus displaying the associated images.

Figure 2:
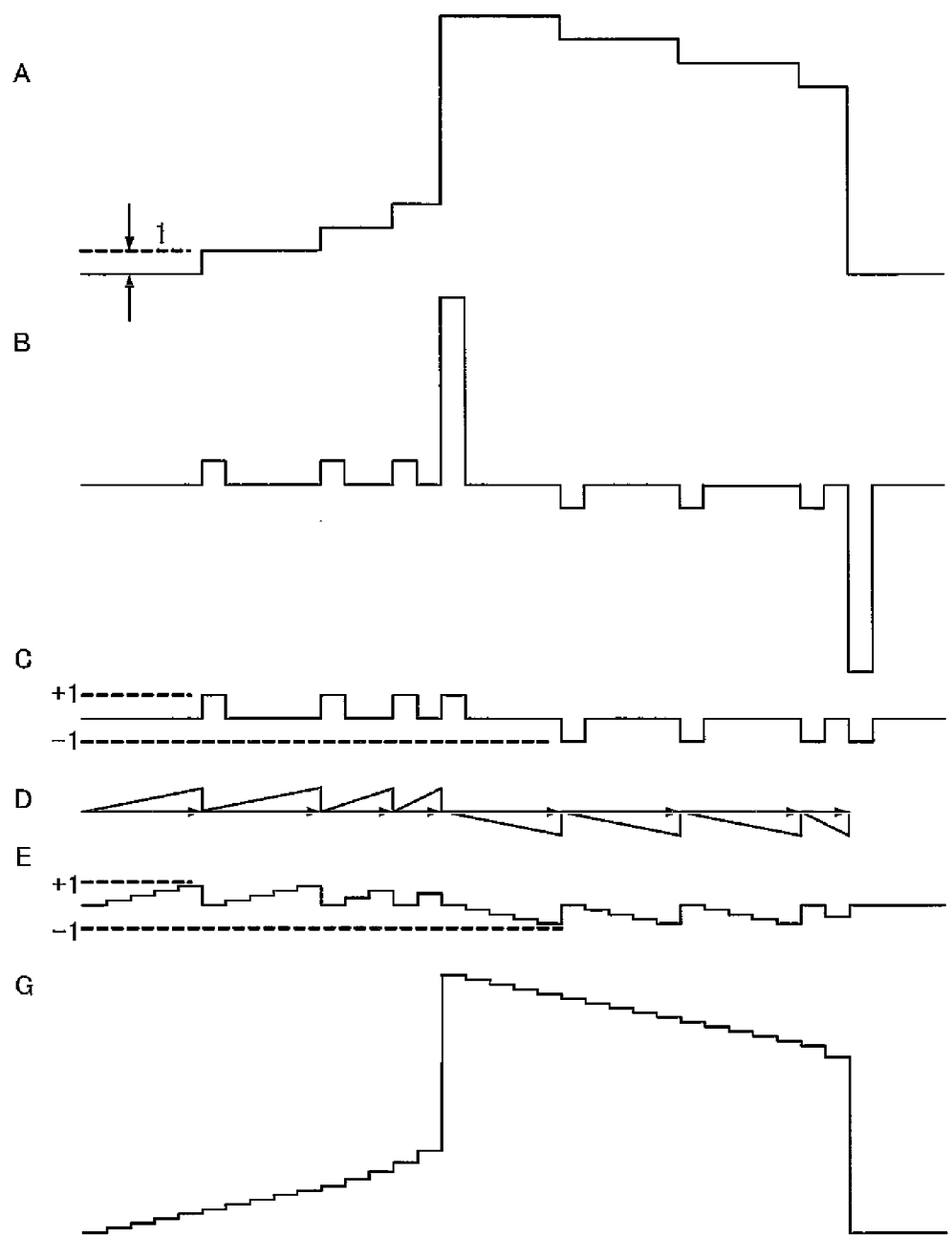
FIG. 2 is a schematic diagram illustrating operation of the image processor apparatus according to Embodiment 1 of the present invention.

Operation of the grayscale processor 3 (image processor apparatus) will be described below in a greater detail referring to FIG. 2. FIG. 2A shows a part of pixels aligned in the horizontal direction of the image signal A that has been output from the receiver unit 2, with the vertical direction showing the gray level and the horizontal direction, the horizontal pixel position. The level difference at the far left side is assumed to represent the difference of one gray level.

In the description of the present invention, a noise resulted from A/D conversion is referred to as quantization noise while a noise resulted from image processing is referred to as a tone jump, thereby distinguishing both noises from each other. In the former, values that have been consecutive in an analog fashion are digitized to become discrete values; in the latter, values that have been consecutive in a digital fashion are image-processed to become more discrete. There is a commonality between both values in that output values are turned into discrete ones with respect to input values.

FIG. 2B shows a difference of the grayscale value between neighboring pixels in the image signal A calculated by the variation calculator 5. If the grayscale value of a pixel in a horizontal position x is represented as P(x), the difference between pixels in horizontal position x can be represented as P(x)−P(X−1). Differences, thus obtained to the respective pixels, of grayscale value between neighboring pixels in a single dimension, are transferred from the variation calculator 5 to the variation limiter 6, as variation B.

FIG. 2C shows the variation C as limited to within a range of −1 to +1. That is, the variation C as output from the variation limiter 6 is constituted by values of +1, 0 and −1, where among the amount of variation B, the fourth one at the left side and one at the far right end, which are located outside the range of −1 to +1, are limited to +1 and −1, respectively.

FIG. 2D shows an operational concept of the gradient determination unit 7. The gradient determination unit 7 detects the number of consecutive zeros (the pixel number) from the variation C as input from the variation limiter 6—i.e., the width of pixel in which grayscale has not varied. Next, a very small gradient D of grayscale is calculated from the detected width (distance) and the value of variation C, with the calculated value being transferred to the additional bit generator 8. For instance, when an area where the variation C is zero has seven consecutive pixels, the distance in which no grayscale has varied becomes 7+1=8. If the value of the subsequent variation C is assumed a value of one, then the grayscale gradient in the associated interval becomes 1/8. Further, when an area where the variation C is zero has ten consecutive pixels, the distance becomes 10+1=11. If the value of the subsequent variation C is assumed a value of −1, then the grayscale gradient in the associated interval becomes −1/11.

Based on the gradient D input from the gradient determination unit 7, the additional bit generator 8 generates an additional bit E inclusive of a bit train corresponding to decimal fraction part with respect to the grayscale value of image signal A, to output the additional bit E to the bit adder 10. Here, the additional bit E is generated based on a distance (the pixel number) from a pixel having a change in the variation C and on a gradient calculated by the gradient determination unit 7.

The additional bit E produced by the additional bit generator 8 is transferred to the bit adder 10. The bit adder 10 sums together the additional bit E, generated by the additional bit generator 8, inclusive of a bit train corresponding to a decimal fraction part with respect to the grayscale value, and an image signal F as output from the delay unit 9, to thereby produce an image signal G. Since the additional bit E is to contain the decimal fraction part with respect to the grayscale value of the image signal F (or the image signal A), the image signal G after addition is an image signal that serves as image data of precision of a decimal fraction part—i.e., of higher resolution—in contrast with the image signal F. In other words, since the number of bits of the image signal G is more than that of bits of the image signal F not only the number of gray levels that are capable of representing, but also the resolution of the grayscale increases, which thus enables generation of the images with a smoother grayscale gradient. The image signal G with increased bits is output to the display unit 4, then being displayed as an image.

Figure 3:
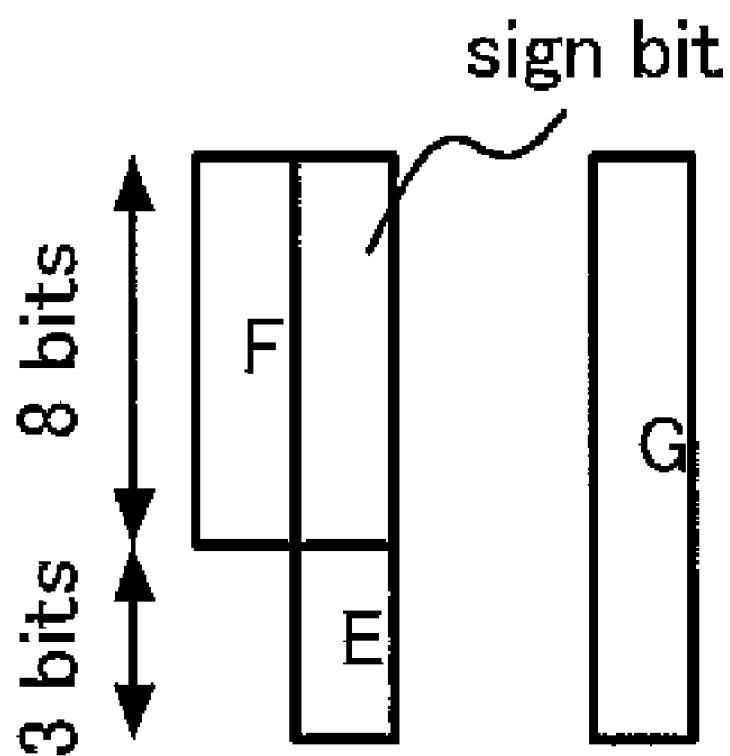
FIG. 3 is a schematic diagram illustrating operation of a bit adder of the image processor apparatus according to Embodiment 1 of the present invention.

FIG. 3 is a view showing relationships of bit trains between the additional bit E generated by the additional bit generator 8, the image signal F that is output by the delay unit 9, and the image signal G that is output by the bit adder 10. Here, situations where the images signal F, the additional bit E, and the image signal G are composed of 8 bits, 3 bits, and 11 bits, respectively will be described. As shown in FIG. 3, the additional bit E becomes the bit train corresponding to decimal fraction part with respect to the image signal F Consequently, the bit adder 10 generates the image signal G of 11 bits by adding the additional bit E so as to combine the bit E with the lowest bit of the image signal F. The bit train of the image signal G extends downward with respect to the image signal F—i.e., the bit train elongates so as to extend the decimal fraction part of the original image signal F. Thus, the resolution of one gray level of the image signal G is higher by 3 bits than that of the image signal F, which can thereby display images of low quantization noise occurring in the A/D conversion (high precision images).

Figure 4:
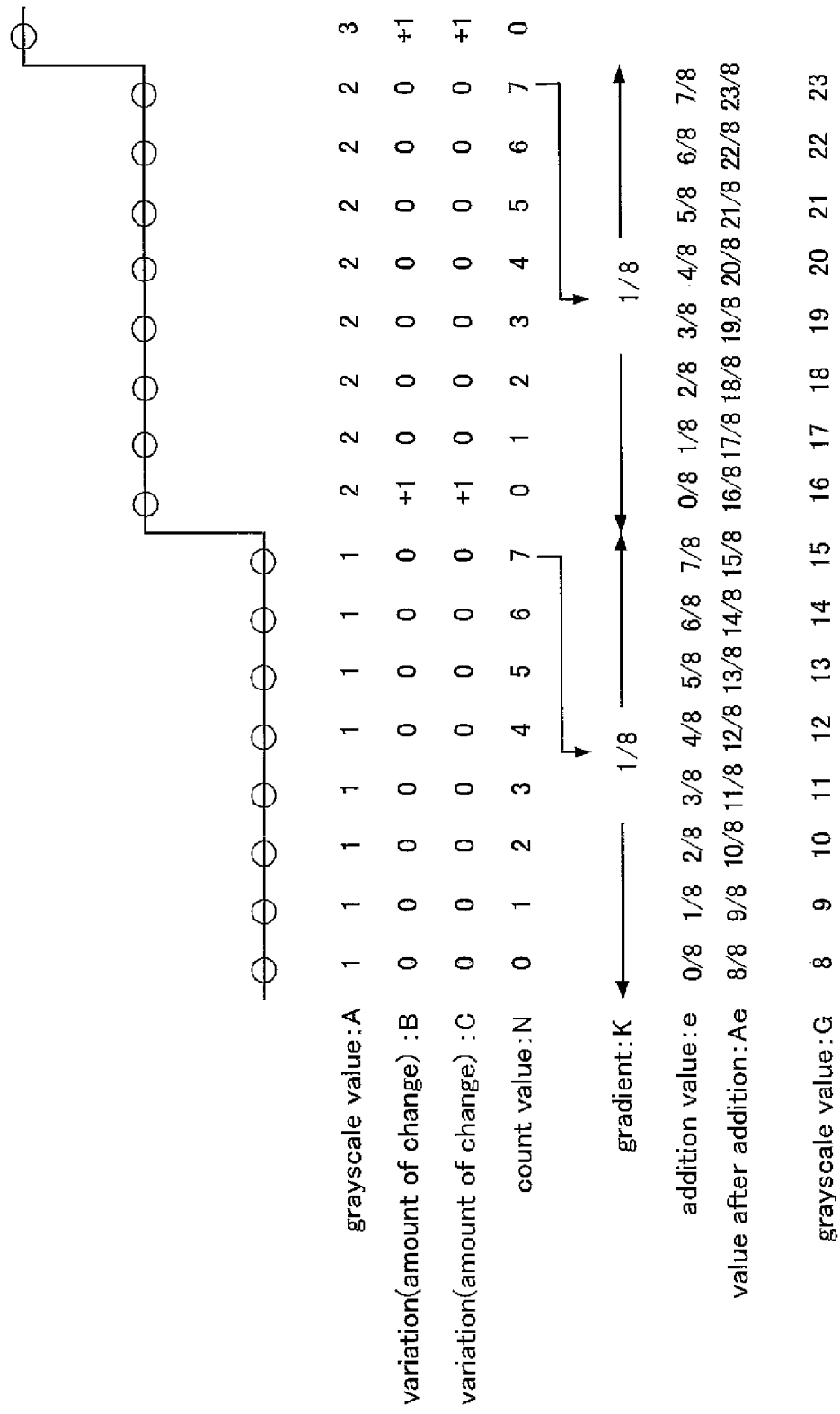
FIG. 4 is a schematic diagram illustrating detailed operation of the image processor apparatus according to Embodiment 1 of the present invention.

FIG. 4 shows a part of the image signal A; operation of the grayscale processor 3, which is an image processor apparatus, will be described in a greater detail referring to this figure. FIG. 4 shows a part of the image signal A made up of three gray levels. There are aligned in sequence from the left pixel in the image signal A eight pixels of the grayscale value 1, eight pixels of the grayscale value 2, and three pixels of the grayscale 3—i.e., if the image signal A is assumed to be composed of 8 bits, a part of images that becomes brighter for each gray level from the left to the right is shown with respect to the eight-bit image signal.

The variation calculator 5 calculates, as the variation B, a difference of the grayscale value between neighboring pixels with respect to the grayscale value train of the image signal A. In FIG. 4, a variation in the pixel of the grayscale value 2 neighboring the grayscale 1 and the pixel of the grayscale value 3 neighboring the grayscale 2 is +1; the variation in the other pixels is zero. The variation B is output to the variation limiter 6.

The variation limiter 6 limits the value of the variation B so that the value falls within a range of −1 to +1. The variation C whose value is limited is output to the gradient determination unit 7. In FIG. 4, since the variation B is composed of values of 0 and +1, the value is not limited. Operation in situations where the value is limited will be described later referring to another figure.

The gradient determination unit 7, which is configured by a counter and the like, counts the number of consecutive zeros of the variation C whose value is limited. State differently, the number of pixels where the variation C is zero is counted, and when the value is other than zero, a then count value is stored, with the value of the counter reset to zero. In FIG. 4, a count value N is reset to zero at the far left pixel, and counting continues until the variation C becomes +1. In the figure is shown the situation where re-counting has started after the count value N is reached to 7. This count value 7 shows that the number of pixels in a consecutive-zero interval (an interval where the grayscale value A is a value of one) is 7+1=8; the gradient determination unit 7 determines a grayscale-gradient K in the interval to be 1/8. Likewise, since a count value N is 7 in an interval where the grayscale value A is 2, a grayscale gradient K in the interval is determined to be (1/(7+1)), which is 1/8. The gradient determination unit 7 outputs the gradient K and the count value N as determination result D, to the additional bit generator 8.

The additional bit generator 8 determines a grayscale value that is to be added to the image signal A using the gradient K and count value N that are included in the determination result D inputted from the gradient determination unit 7, to output to the bit adder 10 a bit train representing the grayscale as the additional bit E. FIG. 4 shows grayscale value that is to be added to the image signal A as an addition value e. Since the minimum grayscale of the image signal A is represented here as a value of one, the addition value e is described as a fractional value smaller than one.

The addition value e can be represented as N×K by the count value N and gradient K. In FIG. 4, an addition value train having a variation of the determined gradient 1/8—which goes as 0/8, 1/8, 2/8, . . . from the left—is obtained.

The bit adder 10 adds the additional bit E indicating the addition value C to the image signal F, whereby a grayscale value of precision smaller than one can be attained as indicated by a grayscale value Ae, a value after addition.

As shown in FIG. 3, actually, the addition value e is also represented as a bit train; the bit adder 10 adds the additional bit E in such a way that the bit E is combined with the lowest bit of the image signal F. At this time, a sign bit of the additional bit E is used as a bit corresponding to an integer part of the image signal F. Then, as shown in FIG. 4, the image signal F represented as, for instance, one gray level of the grayscale 1 and grayscale 2 produces the image signal G capable of being represented in eight gray levels from the grayscale value 8 to the grayscale value 16.

FIG. 3 shows a situation where the number of bits of the additional bit E is 4 (one sign bit included). The number of bits is not limited to this, but more number of bits can be used to represent an addition value, whereby high precision image signals can be attained. For instance, in FIG. 4 is shown a situation where the gradient is 1/8; thus, if the additional bit E is composed of 3 bits, then the representation without error can be made. In a case of 1/7, an addition value e can be represented with less error by using more number of bits. In other words, by selecting a certain large number that a counter can count and further increasing the number of bits representing the gradient determined by the count value N higher precision (higher resolution of gray levels) images can be achieved. For instance, the image can be represented with two times the precision every time the number of bits being counted by the counter and the number of bits showing the gradient are increased by a value of one. For instance, even in a situation where image data of 16 bits (an image of 65536 gray levels) is attained from that of 8 bits (an image of 256 gray levels), the number of bits for representing the counter and gradient is 8 bits that is all required to correspond to the decimal fraction part, which thereby allows for high precision images by a low circuit count.

Figure 5:
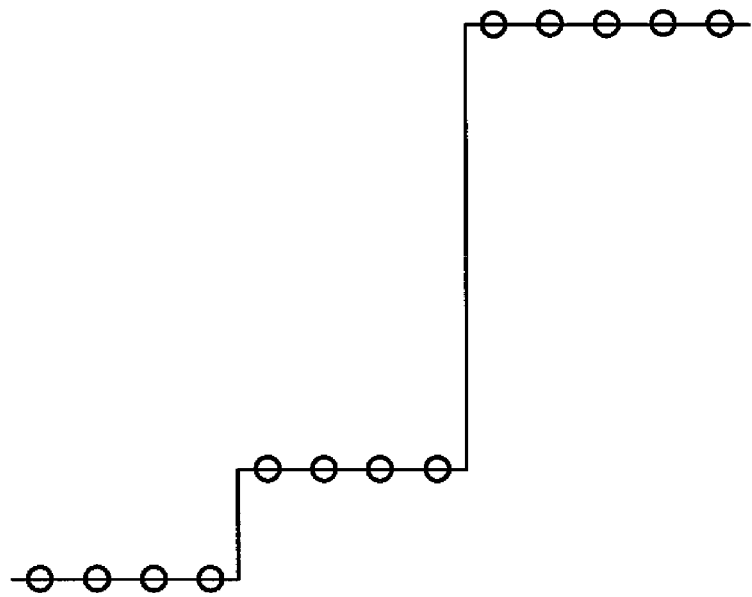
FIG. 5 is a schematic diagram illustrating detailed operation of the image processor apparatus according to Embodiment 1 of the present invention.

FIG. 5 is a view illustrating operation of the grayscale processor 3 in a combination of other grayscale values. FIG. 5 shows a part of the image signal A containing three gray levels. In the image signal A, there are aligned in sequence from the left pixel four pixels of grayscale value 1, four pixels of grayscale value 2, and five pixels of grayscale value 6. Here, a gray scale gradient from the grayscale value 2 to the grayscale value 6 is assumed to represent an edge and that from the value 1 to the value 2, to represent a part of an image that progressively becomes brighter.

The variation calculator 5 calculates a difference between neighboring pixels as the variation B with respect to a grayscale value train of the image signal A. In FIG. 5, the variation in the pixel of the grayscale value 2 adjacent to the grayscale value 1 is +1, and that in the pixel of the grayscale value 6 adjacent to the grayscale value 3 is +4. Variations for other pixels are zero. The variation B is transferred to the variation limiter 6.

The variation limiter 6 limits a value of the variation B so that the variation B falls within a range of −1 to +1. The variation C whose value is limited is output to the gradient determination unit 7. Referring to FIG. 5, the variation of pixel of grayscale value 2 neighboring the grayscale value 1 remains to be +1; the variation of pixel of grayscale value 6 adjacent to the grayscale value 2 is limited from +4 to +1. This variation C whose value is limited is output to the gradient determination unit 7.

The gradient determination unit 7, which is configured by a counter and the like, measures the number of consecutive zeros of the variation C whose value is limited, as the number whose variation B has consecutive zeros. State differently, the counter measures a count when the variation C is zero, and when the value is other than zero, a then count value N is stored, with the value of the counter being reset to zero. In FIG. 5, a count value N is reset to zero at the far left pixel, and counting continues until the variation C reaches +1. In FIG. 5 is shown a situation where a count value N is reset to zero and re-counting has started after the count N is reached to 3. This count value 3 shows that the number of pixels in a consecutive-zero interval (an interval where the grayscale value A is a value of one) is 3+1=4; furthermore, the subsequent variation C is +1. Thus, the gradient determination unit 7 determines a grayscale gradient K in the interval to be 1/4. Likewise, since a count value N is 3 in an interval where the grayscale value A is 2, and the subsequent variation C becomes +1, a grayscale gradient K in the interval is determined to be 1/4. The gradient determination unit 7 outputs the gradient K and the count value N, as determination result D, to the additional bit generator 8.

The additional bit generator 8 determines an addition value e that is to be added to the image signal A using the gradient K and count N that are included in the determination result D inputted from the gradient determination unit 7, to output to the bit adder 10 a bit train representing the addition value e as the additional bit E. FIG. 5 shows grayscale value that is to be added to the image signal A as an addition value e. Here, since the minimum grayscale of the image signal A is represented as 1, the addition value e is described as a fractional value smaller than one.

The addition value e can be represented as N×K by the count value N and gradient K. In FIG. 5, an addition value train having a variation of the determined gradient 1/4—which goes as 0/4, 1/4, 2/4, 3/4 from the left—is attained. Furthermore, in a pixel subsequent to the pixel whose variation B is 4, there are 16 or more consecutive zeros in the variation C. Thus, the addition value e is regarded as zero because the gradient K is smaller than 1/8 of the resolution of the additional bit E.

The bit adder 10 adds the additional bit E showing the addition value e to image signal F, whereby a grayscale value of precision smaller than one can be attained as the grayscale value Ae after addition indicates. Subsequent operation is omitted because it is the same as that of FIG. 4.

As discussed thus far, the number of pixels whose grayscale is invariable is counted using difference trains of grayscale values of pixels neighboring in a single direction of an input image signal. Based on the count result and on a difference between adjacent pixels, a grayscale corresponding to a decimal fraction part to be added to each pixel is created to then add the grayscale to the original image signal, whereby precision images higher than those of the original image signal are produced, thus allowing a smoother grayscale image to be represented.

In other words, according to Embodiment 1, the apparatus comprises the variation calculator 5 that calculates, as the variation B of grayscale, a difference in grayscale value between pixels neighboring in a single dimension in a spatial direction of the image signal A; the variation limiter 6 that limits a range of a possible value of the variation B calculated by the variation calculator 5; the gradient determination unit 7 that calculates a gradient of grayscale of image signals from the variation C having the value limited; the additional bit generator 8 that generates an additional bit based on the image signals grayscale gradient calculated by the gradient determination unit 7, the bit adder 10 that adds to the image signals the additional-bit-generator-8-generated additional bit E, to output the image signal G added by the additional bit E; and the display unit 4 display an image signal G outputted from the bit adder 10. Thus, since the quantization number of image signals can be increased in real time by increasing the quantization number of input image signals based on gradient of grayscale in a single direction, a quantization noise, which occurs in an A/D conversion, is reduced when images are displayed by a high intensity display device as well, whereby image processor apparatus, image display apparatus, and a method of processing an image are provided to display images of smoothed gray level and high definition.

Furthermore, the apparatus comprises the image processor apparatus 3, an image receiver unit 2 that receives image signals, to output an image signal A to the image processor apparatus 3, and a display unit 4 that displays an image signal G to be output by the image processor apparatus 3; thus, a quantization noise occurring in the A/D conversion is reduced, which thereby provides an image display apparatus 100 capable of displaying smoothed gray level and high resolution images.

Further, images are processed in such a manner that a difference in grayscale value between pixels neighboring in a single dimension in a spatial direction of an image signal A is calculated as the variation B of grayscale; the range of a possible value of the variation B is limited, and the grayscale gradient K is calculated by the pixel number in the single dimension, in which the variation B has consecutive zeros, and the variation C having the value limited; and by adding to the image signal an additional bit E generated based on the grayscale gradient K, an image signal of a quantization error smaller than a quantization error of the image signal is generated. Thus, even when a high intensity display device displays images, a method of processing images is achieved that can reduce a quantization noise occurring in the A/D conversion, thereby displaying images of smoothed gray levels and high resolution.

In particular, the additional bit generator 8 generates the additional bit E inclusive of a bit train corresponding to a decimal fraction part, with respect to the grayscale value of the received image signal A. The bit adder 10 adds to the image signal F the additional bit E inclusive of a bit train corresponding to the decimal fraction part, whereby an image signal G whose quantization number is more than the image signal F is generated, thereby allowing for high precision images by a low circuit count.

Further, the gradient determination unit 7 is configured in such a way that the pixel number (N+1) whose variation B has consecutive zeros in the single dimension direction and the variation C having the value limited, serve to calculate the gradient K of grayscale of the image signal A. Thus, high speed image processing can be carried out without a need of complex computation.

Moreover, the variation limiter 6 limits the variation-calculator-5-calculated variation B to be within a range of the maximum to minimum values. Thus, in pixels such as the edge portion, whose variation exceeds the range of −1 to +1, the associated difference is retained, which therefore allows for representation of smoothed gray levels of regions other than the edge while retaining the edge information.

Embodiment 2

Figure 6:
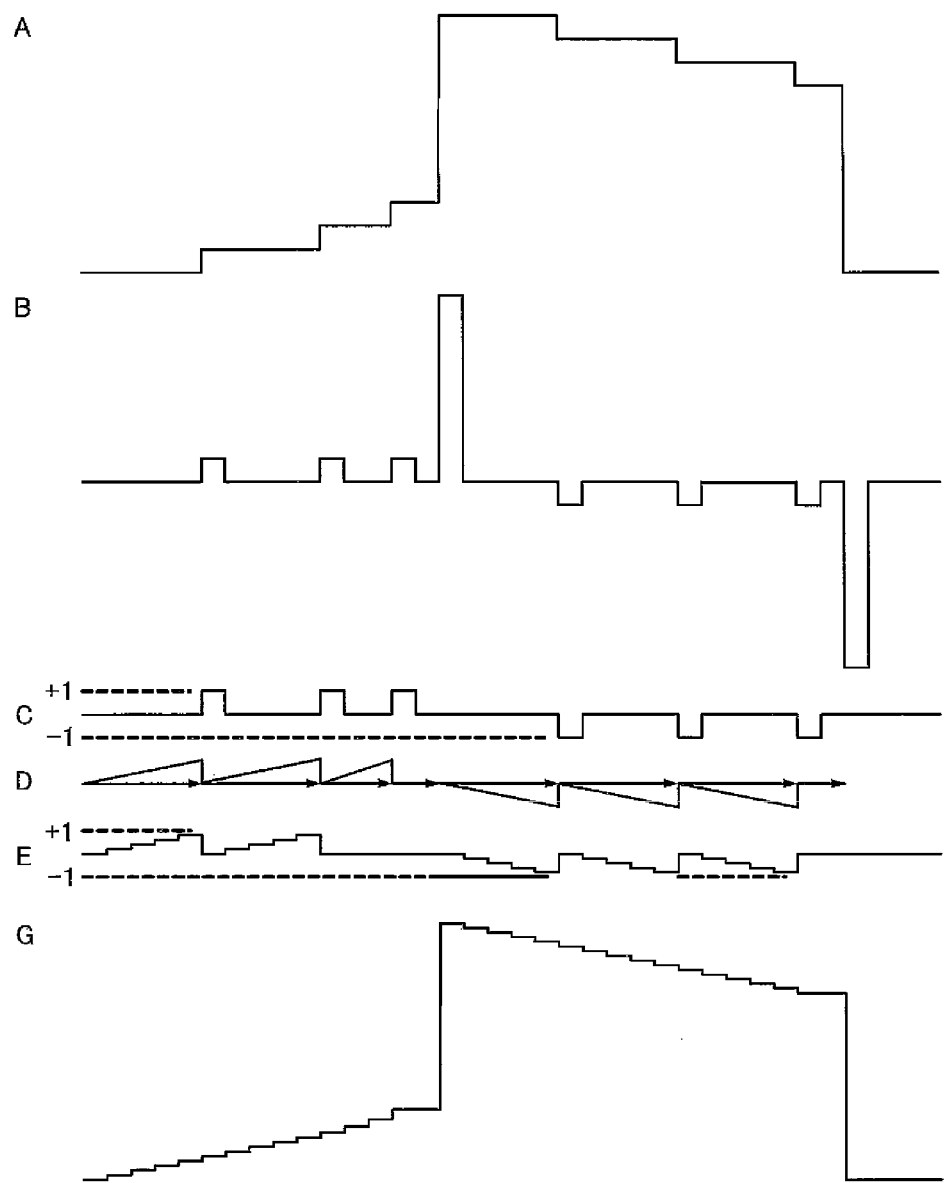
FIG. 6 is a schematic diagram illustrating operation of an image processor apparatus according to Embodiment 2 of the present invention.

In the description of the operation of the image display apparatus in Embodiment 1, when the variation B as outputted by the variation calculator 5 exceeds the range as defined by the maximum and minimum values, the variation limiter 6 limits the value to assume the maximum or minimum value. However, in Embodiment 2, when in the grayscale processor 3 being the image processor apparatus, the value of the variation B exceeds the range of −1 to +1, the apparatus is configured so that the value is set to zero—that is, a value of no variation being present in grayscale value. For instance, FIG. 6 shows a situation where among variations B, the variation B of the fourth from the left side, and that at the far right side becomes a large value (absolute value) exceeding the range defined by the maximum value +1 and minimum value of −1, the variation C is set to zero. Further, when the variation B exceeds the range defined by the maximum and minimum value, the variation limiter 6 outputs to the gradient determination unit 7 a signal for resetting a counter. The counter in the gradient determination unit 7 measures a count when the variation C is zero; when the variation C is a value other than zero and the reset signal is input to the unit 7, a then count value N is stored to reset the count of the counter to zero.

Since the foregoing configuration allows the additional bit E to be zero in a region where the variation B exceeds −1 or +1, i.e., in an edge region, a grayscale value is not to be added to the original image signals in an edge region where the variation B exceeds −1 or +1, thereby allowing for the increase of smoothed gray levels of images in regions other than the edge region while retaining acutance of the edge region.

Figure 7:
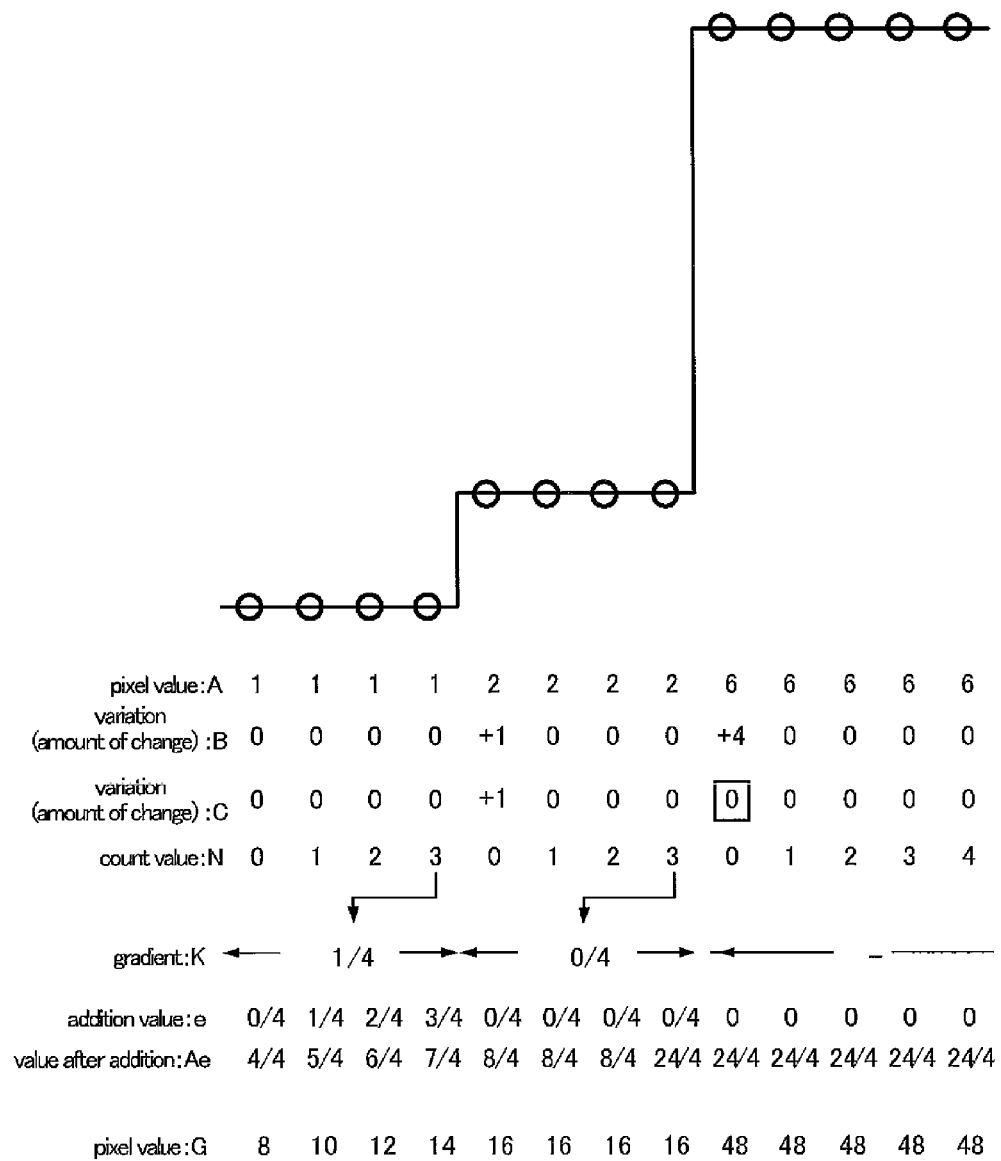
FIG. 7 is a schematic diagram illustrating detailed operation of the image processor apparatus according to Embodiment 2 of the present invention.

FIG. 7 is a schematic diagram illustrating how to generate an additional bit E with respect to a combination of the grayscale values as shown in FIG. 6. FIG. 7 differs from FIG. 5 in that the variation C is set to zero when the variation B of a pixel having a gray scale value of 6 adjacent to a pixel having a gray scale value of 2 is +4. In this way, when the variation B exceeds the predetermined value, the variation C is considered to be zero. Further, by resetting the count value N, the addition value e is zero in a region of the grayscale value 2 adjacent to the pixel of the grayscale value 6. As a result, the grayscale value is not added in pixels neighboring an edge whose absolute value of the variation B exceeds a value of one, thus allowing increase of smoothed gray level images in regions other than the edge while retaining acutance (edge information) of the image.

That is, according to Embodiment 2, when the variation B computed by the variation calculator 5 exceeds the range defined by preliminarily determined maximum and minimum values, the variation limiter 6 specifies the variation C to be zero. Thus, in an edge region where the variation B exceeds the predetermined range, no grayscale value is added to the original image signal, which therefore allows the increase of smoothed gray levels of images in regions other than the edge while retaining acutance of the edge portion.

In the description of the operations in Embodiment 1 and Embodiment 2, shown are situations where an additional bit E created according to the variation of grayscale value of pixels neighboring in the horizontal direction of the input image signal is added to the image signal F, whereby the grayscale processor 3 reduces the quantization noise. However, according to the variation BV calculated from a difference of grayscale value pixels neighboring in the vertical direction of the input image signal F, an additional bit EV may be generated and then added to the image signal F, which achieves a similar advantageous effect.

In addition, with respect to both directions, the horizontal and vertical directions, processing may be carried out sequentially. In such situations as well, since the additional bit E is to be generated based on the difference of grayscale value of pixels neighboring in the single dimension, image processing can be achieved in real time without a need for complex computation.

Moreover, by outputting the variation B from the variation calculator 5 to the variation limiter 6 and gradient determination unit 7, the gradient determination unit 7 may count a value whose variation B has consecutive zeros, directly from a value of variation B.

Embodiment 3

Figure 8:
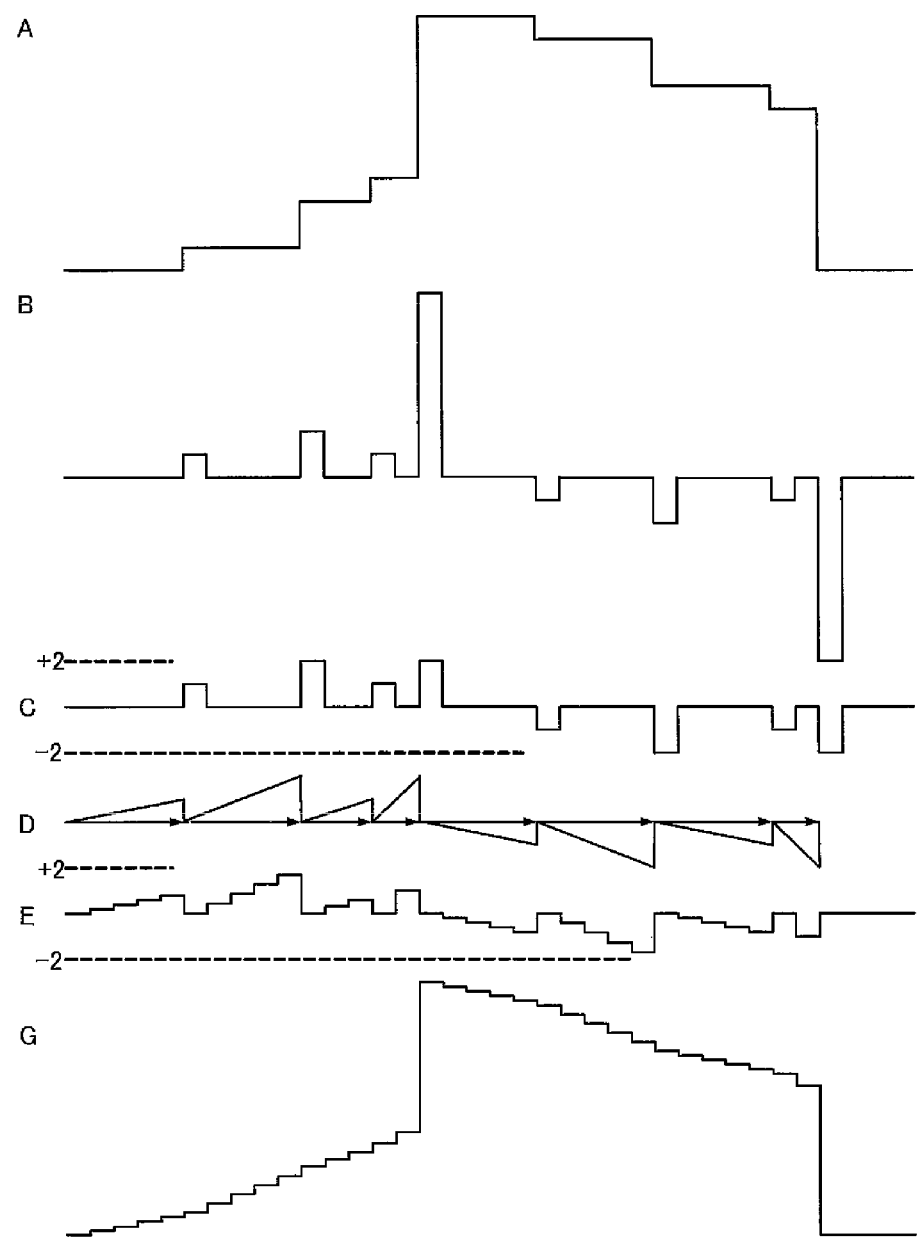
FIG. 8 is a schematic diagram illustrating operation of an image processor apparatus according to Embodiment 2 of the present invention.

FIG. 8 is a schematic diagram illustrating operation of a grayscale processing circuit 3 being an image processor apparatus according to Embodiment 3 of the present invention. In Embodiment 1 and Embodiment 2, situations where the variation limiter 6 limits the variation-calculator-5-calculated variation B to within a range of −1 to +1 have been described; however, the variation is not limited to such values. The variation limiter 6 in Embodiment 3 limits a value of the variation B based on the preliminarily determined maximum value (positive value) and minimum value (negative value).

FIG. 8A shows a part of an image signal A outputted from the receiver unit 2; in the horizontal direction shown is the horizontal position of the image, and in the vertical direction, the gray levels of pixels. The image signal A is forwarded from the receiver unit 2 to the variation calculator 5. As shown in FIG. 8B, the variation calculator 5 calculates, as the variation B of grayscale, a difference of grayscale value of adjacent pixels. The variation B of grayscale transferred from the variation calculator 5 is input to the variation limiter 6. The variation limiter 6 limits an output value so that the input variation B is within a range between the preliminarily determined maximum and minimum values. In FIG. 8, the situation where the maximum value is +2 and the minimum value is −2 has been described; however, the variation is not limited to such values, but arbitrary values can be selected. As a matter of course, absolute values in the maximum value (positive value) and minimum value (negative value) may differ to each other.

The variation limiter 6 limits a value of the input variation B to be within a range of +2 to −2, A variation whose value is limited is output as the variation C to the gradient determination unit 7. In FIG. 8, a positive value in the fourth from the left and a negative value in the far right are limited to +2 and −2, respectively.

The gradient determination unit 7 calculates based on the input variation C a gradient D of grayscale in each interval. Here, since the variation C is limited to within a range between +2 and −2, the gradient becomes a value within a range of +2 to −2.

The additional bit generator 8 generates, based on the gradient D transferred from the gradient determination unit 7, an additional bit E inclusive of a bit train corresponding to decimal fraction part of grayscale to be added to an image signal F to then output the additional bit E to the bit adder 10.

The bit adder 10 adds an additional bit E output by the additional bit generator 8 to the image signal F output from the delay unit 9, then generating a new image signal G to output it to the display unit 4.

Figure 9:
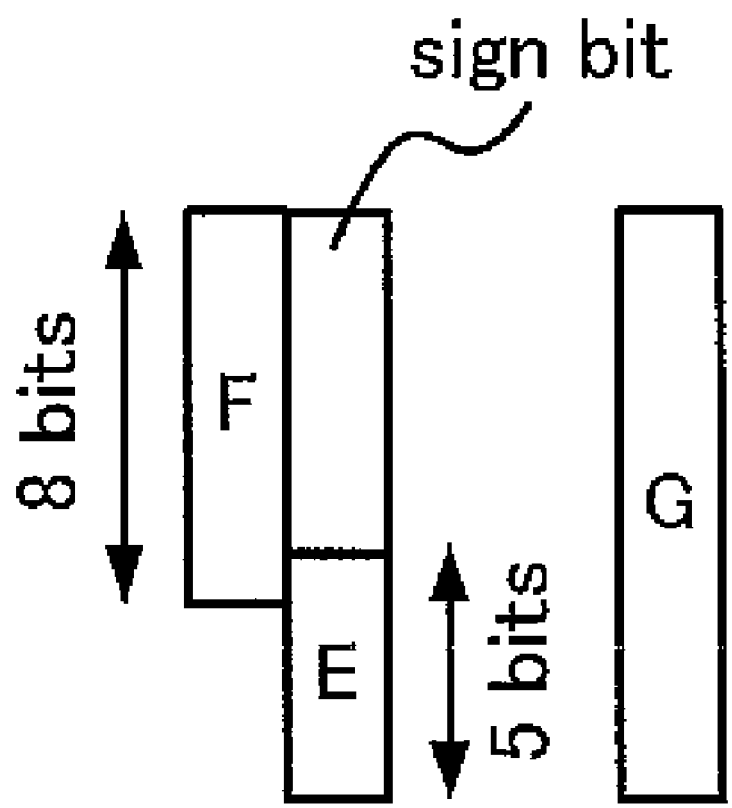
FIG. 9 is a schematic diagram illustrating operation of a bit adder of the image processor apparatus according to Embodiment 3 of the present invention.

FIG. 9 is a schematic diagram showing a relationship between the image signal F that is input to the bit adder 10, the additional bit E, and the image signal G that is output by the bit adder 10. FIG. 9 shows the situation where the image signal F is 8 bits in length, the additional bit is 6 bits (inclusive of the sign bit of one bit) in length, and the image signal G is 12 bits in length. When the additional bit E is 5 bits in length, the variation C is limited to be within a range of −2 to +2, whereby the additional bit E contains 4-bit decimal fraction part and 1-bit integer part with respect to the image signal F. Thus, the bit adder 10 adds the image signal F to the additional bit E so that positions of the image signal F and of the integer part of the additional bit E may coincide. In addition, the sign bit of the additional bit E is used for remaining bits of the image signal F.

It is of course to be understood that when the maximum value is +4 and the minimum value is −4, the number of bits in the integer part of the additional bit E increases; in agreement with the integer part of the additional bit E, the bit adder 10 adds the additional bit E to the image signal F.

Further, the decimal fraction part of the additional bit E may be that other than 4 bits; the more the number of bits of the decimal fraction part, the more the quantization noise of the image signal G reduces.

With the above-described arrangement, even when the image signal A includes quantization noise larger than one, which is the minimum value of grayscale, the quantization noise is reduced in real time, thereby allowing for representation of images of smoothed gray levels and high definition.

In other words, according to Embodiment 3, the variation limiter 6 limits the variation-calculator-5-calculated variation B to be within a range defined by preliminarily determined maximum and minimum values; thus, the difference in pixels having a variation exceeding a predetermined range defined as an edge region is emphasized effectively. For this reason, in regions other than the edge region, smoothed gray level images can be produced while emphasizing the edge region.

Embodiment 4

Figure 10:
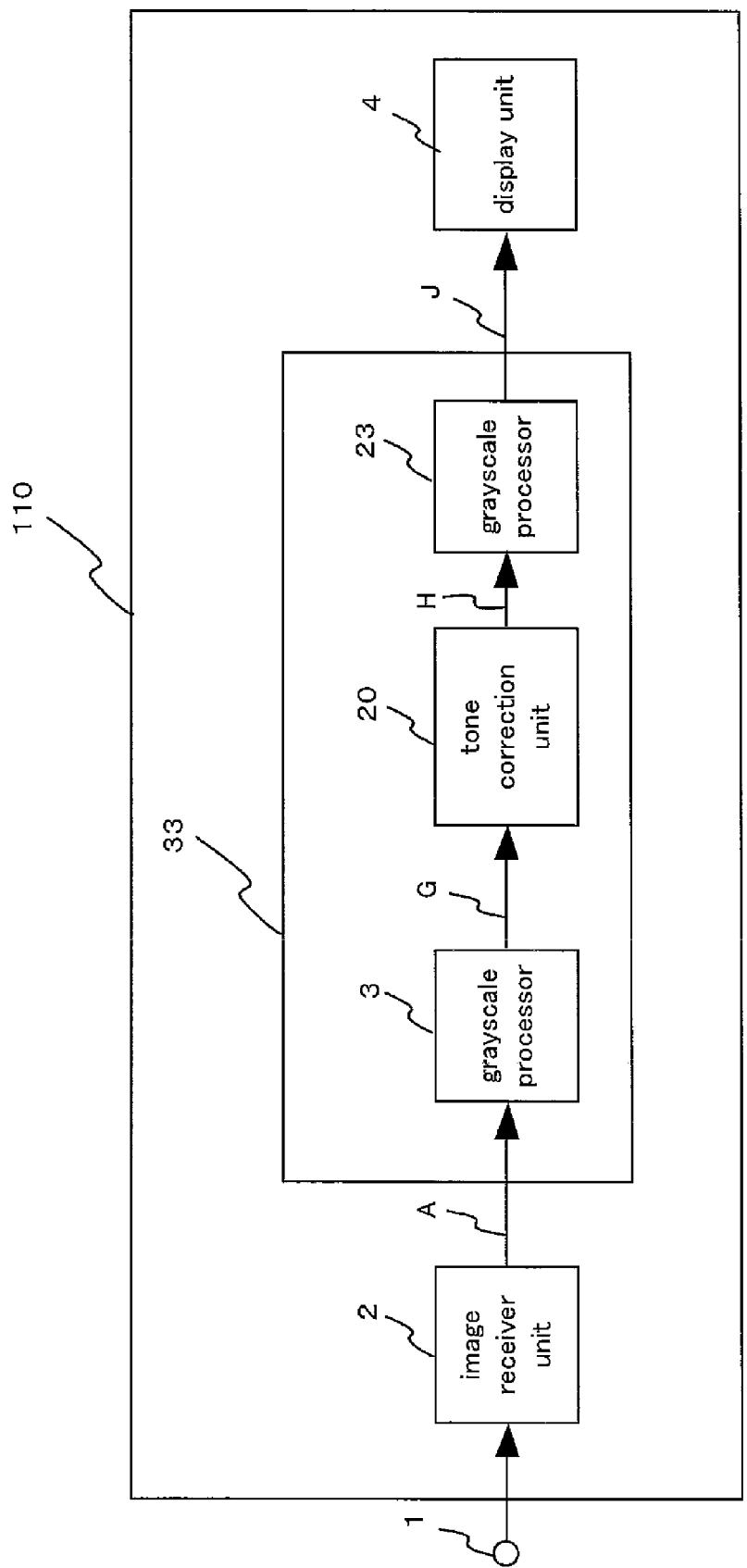
FIG. 10 is a block diagram showing a configuration of an image display apparatus according to Embodiment 4 of the present invention.

FIG. 10 is a block diagram showing a configuration of an image display apparatus 110 according to Embodiment 4 of the present invention. For Embodiment 1 through Embodiment 3, the situation has been described where in an image processor apparatus configured by the grayscale processor 3, the grayscale processor 3 increases the quantization number of the image signal A that has been output by the receiver unit 2. In Embodiment 4, as shown in FIG. 10, an image processor apparatus 33 is configured by the grayscale processor 3, a tone correction unit 20 and a grayscale processor 23. After the grayscale processor 3 increases the quantization number of the image signal A, the tone correction unit 20 corrects the grayscale such as expanding the dynamic range and improving the contrast. In order to reduce an image signal H tone jump that has become more noticeable with the grayscale correction, the grayscale processor 23 is provided as an additional processor. Note that description of the grayscale processor 23 is omitted because the configuration thereof is the same as that of the grayscale processor 3.

Figure 11:
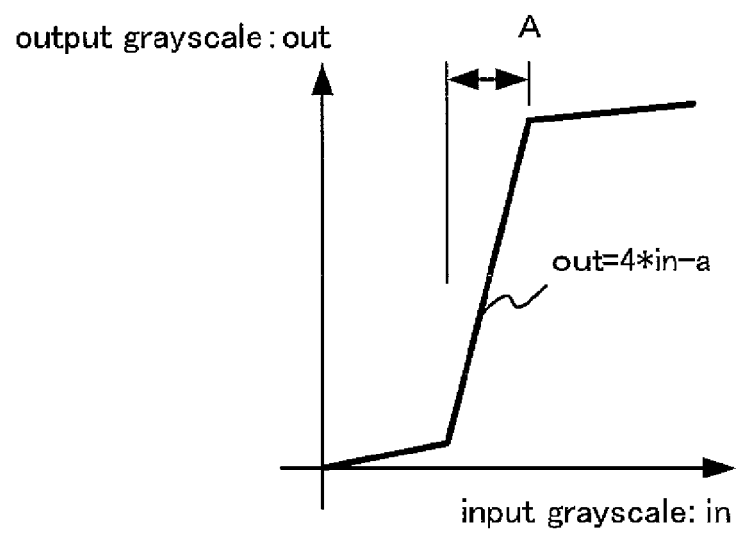
FIG. 11 is a schematic diagram showing operation of a tone correction unit of an image processor apparatus according to Embodiment 4 of the present invention.
Figure 12:
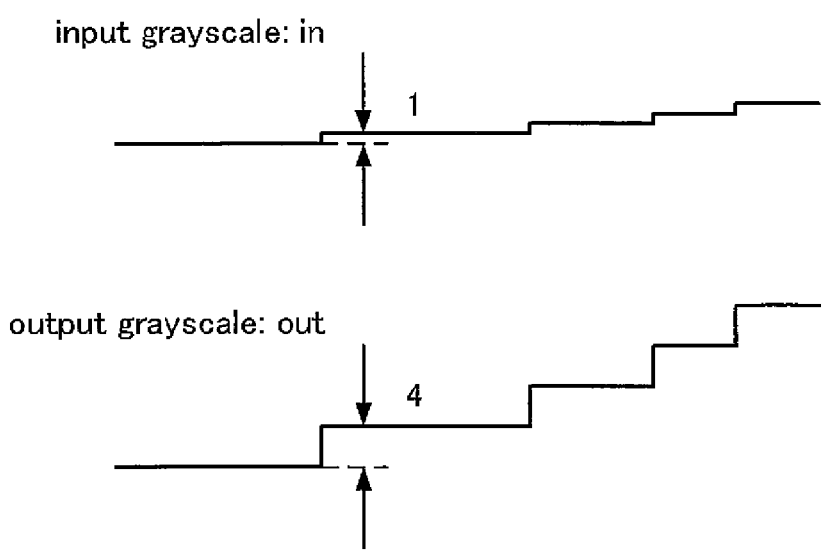
FIG. 12 is a schematic diagram showing operation of another tone correction unit of the image processor apparatus according to Embodiment 4 of the present invention.

An image signal that has been input from the input terminal 1 is received at the receiver unit 2; an image signal A, which has been converted into a predetermined format, is output to the grayscale processor 3. The grayscale processor 3 implements the processing, shown in any of Embodiment 1 through Embodiment 3, of the input image signal A, to reduce a quantization noise. An image signal G having the quantization noise reduced is input to the tone correction unit 20 and then the grayscale correction is made. FIG. 11 is a graph showing an example of grayscale correction processing carried out by the tone correction unit 20. Here, as shown in FIG. 11, the processing is implemented in which a gain of grayscale in the interval A of the input image signal G is increased to 4 times the gain. When the grayscale of the image signal G is mostly distributed in the interval A, this processing causes the dynamic range of represented images to be expanded, with the associated images being represented as high contrast ones. On the other hand, despite the fact that the grayscale processor 3 has eliminated the quantization noise, the tone jump in the interval A may in some cases be caused by a grayscale characteristic conversion executed by the tone correction unit 20. FIG. 12 is a view showing a relationship between gray scales prior to and subsequent to the grayscale correction in situations where an image signal that is input to the tone correction unit 20 continuously varies in the grayscale in the interval A of FIG. 11. As shown in FIG. 12, when the gain in the interval A is fourfold, there are only values of every 4 for grayscale of an output image in the interval; even in a region in which images become progressively bright, a variation of the associated grayscale occurs in multiples of four gray levels, thus causing occurrence of tone jump that becomes noticeable.

Figure 13:
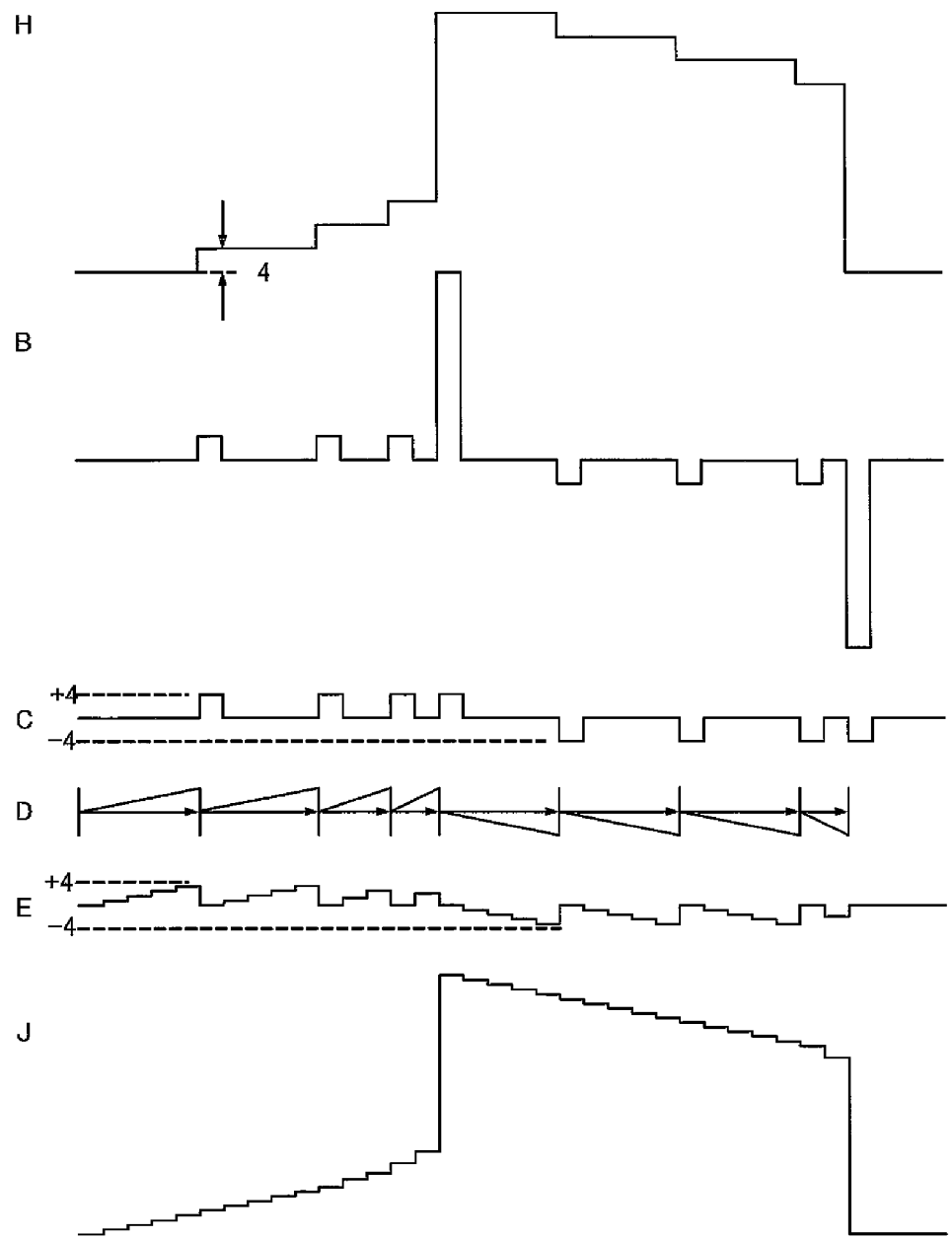
FIG. 13 is a schematic diagram illustrating operation of a grayscale processor of the image processor apparatus according to Embodiment 4 of the present invention.

In this way, the image signal H whose tone jump has increased with expanding the dynamic range is output from the tone correction unit 20 and input to the grayscale processor 23. The grayscale processor 23 reduces the tone jump of the image signal H through the same processing as that of the grayscale processor 3, to output a post-processing image signal J to the display unit 4. Here, when the tone correction unit 20 carries out the processing in such a way to cause tone jump at four gray levels, the maximum and minimum values in a variation limiter 26 of the grayscale processor 23 may be set to +4 and −4, respectively. In this way, the maximum and minimum values of the variation limiter 26 in the grayscale processor 21 can be set according to the amount of tone jump effect to be caused by characteristics of the tone correction unit 20. FIG. 13, which is a diagram for illustrating operation of the grayscale processor 23, shows a situation where, as described in the foregoing description, the minimum and maximum values of the variation limiter 26 of the grayscale processor 23 are determined to be −4 and +4, respectively in accordance with the amount of the tone jump effect caused by image correction by the tone correction unit 2. As shown in FIG. 13C, the variation C that is limited to within a range of −4 to +4 is generated from the variation B. Description of operation other than that described here is omitted because the operation is the same as that of FIG. 8 in Embodiment 3.

FIG. 13 is a diagram for illustrating operation of the grayscale processor 23, shows a situation where, as described in the foregoing description, the minimum and maximum values of the variation limiter 26 of the grayscale processor 23 are determined to be −4 and +4, respectively in accordance with the amount of the tone jump effect caused by image correction by the tone correction unit 2. As shown in FIG. 13C, the variation C that is limited to within a range of −4 to +4 is generated from the variation B. Description of operation other than that described here is omitted because the operation is the same as that of FIG. 8 in Embodiment 3. FIG. 13, which is a diagram for illustrating operation of the grayscale processor 23, shows a situation where, as described in the foregoing description, the minimum and maximum values of the variation limiter 26 of the grayscale processor 23 are determined to be −4 and +4, respectively in accordance with the amount of the tone jump effect caused by image correction by the tone correction unit 2. As shown in FIG. 13C, the variation C that is limited to within a range of −4 to +4 is generated from the variation B. Description of operation other than that described here is omitted because the operation is the same as that of FIG. 8 in Embodiment 3.

Figure 14:
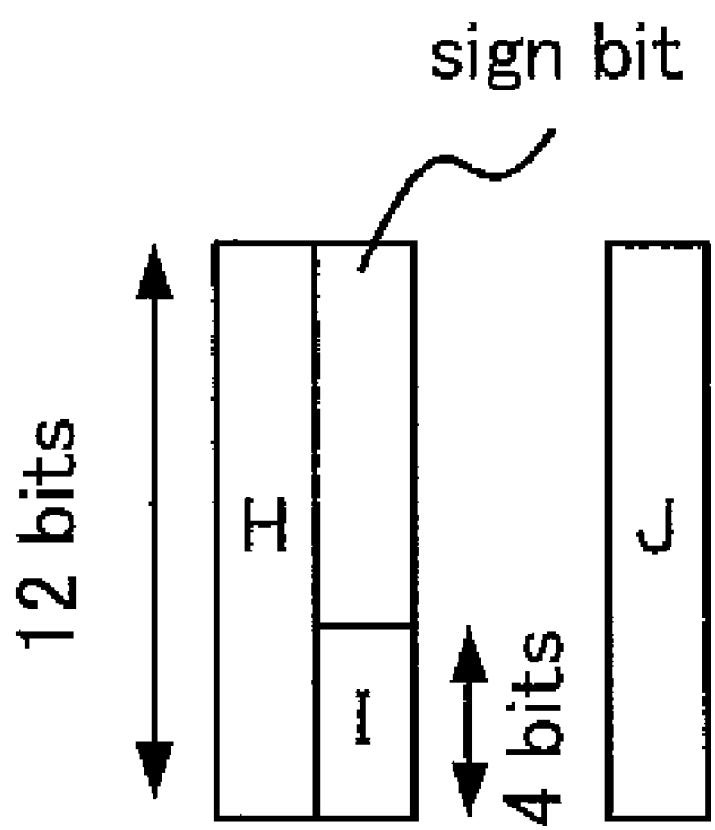
FIG. 14 is a schematic diagram showing operation of a bit adder of the image processor apparatus according to Embodiment 4 of the present invention.

FIG. 14 is a diagram showing an example of operation of the bit adder 10 in the grayscale processor 23. In the figure, a situation is shown where since the grayscale processor 3 increases the quantization number, the grayscale processor 23 reduces the tone jump without increasing the quantization number (the number of bits of image signals). As shown in FIG. 14, the additional bit generator 8 generates an additional bit I that contains only an integer part with respect to the image signal H; the bit adder 10 adds the additional bit I to the image signal H, to thereby create an image signal J. The image signal J is input to the display unit 4, with tone-jump-reduced images being displayed on the unit.

As described above, even when the tone correction unit 20 expands the dynamic range and implemented the processing of contrast correction after the grayscale processor 3 has reduced the quantization noise, the processing can be carried out without searching a grayscale image in which tone jump is caused, by setting in agreement with a characteristic of the tone correction unit 20 the limit values (maximum value and minimum value) of variation B in the variation limiter 26. Thus, the quantization noise is reduced in real time as well as the tone jump caused by image processing is also reduced, which can represent images of smoothed gray levels and high definition.

In other words, according to Embodiment 4, the maximum and minimum values to be used by the variation limiter 26 are decided in accordance with the amount of the tone jump effect to be caused by image processing such as grayscale correction; thus, the processing of reducing the tone jump can be implemented without searching a grayscale that causes the tone jump; the quantization noise is reduced in real time as well as the tone jump caused by image processing is also reduced, which can represent images of smoothed gray levels and high definition.

In FIG. 10, the situation where the tone correction unit 20, which is downstream of the grayscale processor 3, implements correction of the grayscale has been shown; besides, by placing at the position of the tone correction unit 20 an image processor apparatus in which the tone jump might become more noticeable, the noticeable amount of the tone jump effect caused by the image processing can be reduced. As a matter of course, the maximum and minimum values in the variation limiter 26 of the grayscale processor 23 may be decided in accordance with the amount of the tone jump effect caused by the characteristic of the image processor, and serve to reduce the tone jump caused by the image processing.

What is claimed is:

1. An image processor apparatus for processing image signals that contain discrete image data in a temporal direction and a spatial direction and for transferring the processed image signals to a display unit, the image processor apparatus comprising:
    a variation calculator that calculates, as a variation of grayscale, a difference in a grayscale value between adjacent pixels in a single dimension in a spatial direction, of an image signal;
    a variation limiter that outputs a value in a limited range between predetermined maximum and minimum values in response to the variation of grayscale being outside said limited range, and outputs a value of the variation of grayscale in response to the variation of grayscale being within said limited range, the predetermined maximum value being a positive value and the predetermined minimum value being a negative value;
    a gradient determination unit that calculates a grayscale gradient of the image signal from the outputs of the variation limiter;
    an additional bit generator that generates an additional bit, based on the grayscale gradient; and
    a bit adder that adds to the image signal the additional bit, wherein the gradient determination unit counts a number of consecutive pixels in the single dimension of the image signal in which the consecutive pixels have a same grayscale value, based on the outputs of the variation limiter, and calculates the grayscale gradient from both the outputs of the variation limiter and the counted number of consecutive pixels.

2. The image processor apparatus of claim 1, wherein
the additional bit includes a bit train corresponding to a decimal fraction part with respect to a grayscale value of the image signal; and
the bit adder adds to the image signal the additional bit to thereby generate an image signal having a quantization number more than that of the image signal.

3. An image display apparatus, comprising:
an image processor apparatus of claim 2;
an image receiver unit that receives an image signal, to output the image signal to the image processor apparatus; and
a display unit that displays an image based on a processed image signal that is output by the image processor apparatus.

4. An image display apparatus, comprising:
an image processor apparatus of claim 1;
an image receiver unit that receives an image signal, to output the image signal to the image processor apparatus; and
a display unit that displays an image based on a processed image signal that is output by the image processor apparatus.

5. The image processor apparatus of claim 1, wherein the variation limiter limits the variation-calculator-calculated-variation to within a range between preliminary determined maximum and minimum values.

6. The image processor apparatus of claim 5, wherein the maximum and minimum values to be used by the variation limiter are determined according to the amount of tone jump effect caused by image processing such as tone correction.

7. An image display apparatus, comprising:
an image processor apparatus of claim 6;
an image receiver unit that receives an image signal, to output the image signal to the image processor apparatus; and
a display unit that displays an image based on a processed image signal that is output by the image processor apparatus.

8. An image display apparatus, comprising:
an image processor apparatus of claim 5;
an image receiver unit that receives an image signal, to output the image signal to the image processor apparatus; and
a display unit that displays an image based on a processed image signal that is output by the image processor apparatus.

9. An image display apparatus, comprising:
an image processor apparatus of claim 1;
an image receiver unit that receives an image signal, to output the image signal to the image processor apparatus; and
a display unit that displays an image based on a processed image signal that is output by the image processor apparatus.

10. The image processor apparatus of claim 1, wherein the variation limiter adjusts the variation value calculated by the variation calculator based on said limited range.

11. The image processor apparatus of claim 1, wherein said limited range is determined in accordance with an amount of tone jump effect.

12. A method of image-processing that processes an image signal that contains discrete image data in a temporal direction and a spatial direction, the method of image-processing comprising;
calculating as a variation of grayscale, a difference in a grayscale value between adjacent pixels in a single dimension in a spatial direction, of an image signal;
outputting a value in a limited range between predetermined maximum and minimum values in response to the variation of grayscale being outside said limited range, the predetermined maximum value being a positive value and the predetermined minimum value being a negative value;
outputting a value of the variation of grayscale in response to the variation of grayscale being within said limited range;
calculating a grayscale gradient of the image signal from the output values;
generating an additional bit based on the grayscale gradient;
adding to the image signal the additional bit thereby to generate an output image signal having a quantization error smaller than a quantization error of said image signal;
counting a number of consecutive pixels in the single dimension of the image signal in which the consecutive pixels have a same grayscale value, based on the output values; and
calculating the grayscale gradient from both the output values and the counted number of consecutive pixels.

* * * * *